United States Patent Office 3,198,841
Patented Aug. 3, 1965

3,198,841
ALCOHOLS FROM UNSATURATED HYDROCARBONS AND CARBONYL COMPOUNDS
Jay K. Kochi, Berkeley, Calif., assignor to Shell Oil Company, New York, N.Y., a corporation of Delaware
No Drawing. Filed Nov. 24, 1961, Ser. No. 154,875
10 Claims. (Cl. 260—618)

This invention relates to a process of reacting an unsaturated hydrocarbon with a carbonyl compound and to alcohols thereby obtained. More specifically, it is concerned with reacting an aliphatic carbonyl compound with a vinyl compound in an oxygenated organic solvent in the presence of an alkali or alkaline earth metal and subsequent hydrolysis of the resultant compound to an alcohol.

The reactions of alkali metals with the unsaturated centers of organic compounds is well known classically, Synthetic Rubber (Wiley), 1954. Moreover, the carbanionic polymerization by sodium of vinyl compounds such as styrene, isoprene and/or butadiene are known as industrially important reactions in the polymer industry. U.S. Patent 2,881,234 discloses the use of alkali metals as catalysts for the polymerization of styrene; U.S. Patent 2,466,694 discloses the polymerization of monoolefins, that is, propylene with ethylene, in the presence of alkali metals; and U.S. Patent 2,404,711 discloses that aromatic vinyl compounds, for example, styrene, are capable of being converted into new polymerization products, that is, resins, by subjecting the vinyl compound in the absence of water to the action of acid reacting polymerization catalysts in the presence of aldehydes or ketones which have the carbonyl group conjugated with a carbon-carbon double linkage, that is, for example, styrene and benzaldehyde in the presence of xylene and borofluoroacetic acid react to give a resinous product. In addition, the mixed condensation of two carbonyl compounds is also known.

It has now been found that new and useful alcohols can be prepared by the reaction of unsaturated hydrocarbons with carbonyl compounds in oxygenated organic solvents in the presence of alkali or alkaline earth metals followed by subsequent hydrolysis of the resultant alkali or alkaline earth salt. The novel alcohols of this invention can be represented by the following general formula:

$$(R)_m\text{—}(R')_n \qquad (I)$$

wherein R represents an aliphatic alcohol group, R' represents an aromatic-substituted aliphatic group or an unsubstituted aliphatic group, $m$ is a whole number integer from 1 to 2, inclusive, and $n$ is a whole number integer from 1 to 5, inclusive.

In the above general Formul I, R is preferably a monohydroxy aliphatic alcohol group containing from 3 to 12 carbon atoms, and preferably saturated. Most preferably, R is a monohydroxy lower alkanol group of from 3 to 6 carbon atoms, and of these most preferably a tertiary lower alkanol group. R' is preferably a monophenyl-substituted aliphatic group or an unsubstituted aliphatic group containing from 2 to 12 aliphatic carbon atoms, in either case. Of these monophenyl-substituted aliphatic and unsubstituted aliphatic groups, the aliphatic group is preferably a saturated or unsaturated acyclic group of from 2 to 6 carbon atoms. Of these unsubstituted acyclic groups, the acyclic group is most preferably an olefinically unsaturated acyclic group of from 4 to 8 carbon atoms. It is preferred that $m$ be a whole number integer from 1 to 2, inclusive, and $n$ be a whole number integer from 1 to 3, inclusive.

Alcohols of particular interest in this invention are those shown by the following general formula:

$$\text{HO}\text{—}\underset{\underset{CH_3}{|}}{\overset{\overset{CH_3}{|}}{C}}\text{—}R'' \qquad (II)$$

wherein R'' can be one of the following:

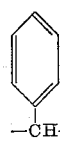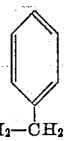
—CH—CH$_2$—CH$_2$—CH$_2$—

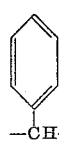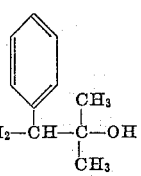
—CH—CH$_2$—CH$_2$—CH—C—OH
                              |
                              CH$_3$
       CH$_3$

—CH$_2$—CH$_2$—CH=CH$_2$

CH$_3$
|
—C—CH=CH$_2$

—CH$_2$—CH=CH—CH$_2$—CH$_2$—CH=CH—CH$_3$

—CH=CH—CH$_2$—CH$_2$—CH=CH—CH$_2$—CH$_3$

CH$_3$         CH$_3$
|              |
—C=CH—CH$_2$—C=CH—CH$_3$

CH$_3$
                         |
—CH$_2$—CH$_2$—CH=CH—C—OH
                         |
                         CH$_3$

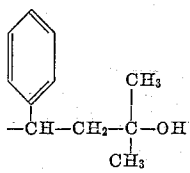
                CH$_3$
                |
—CH—CH$_2$—C—OH
                |
                CH$_3$

—CH$_2$—CH=CH—CH$_3$

—CH=CH—CH$_2$—CH$_3$

CH$_3$
|
—C=CH—CH$_3$

—CH$_2$—CH$_2$—CH=CH—CH$_2$—CH$_2$—CH=CH$_2$

CH$_3$         CH$_3$
|              |
—C—CH=CH—C—CH—CH$_2$

CH$_3$
                              |
—CH$_2$—CH=CH—CH$_2$—C—OH
                              |
                              CH$_3$

CH$_3$   CH$_3$
     |        |
—C—C=CH—C—OH
              |
              CH$_3$

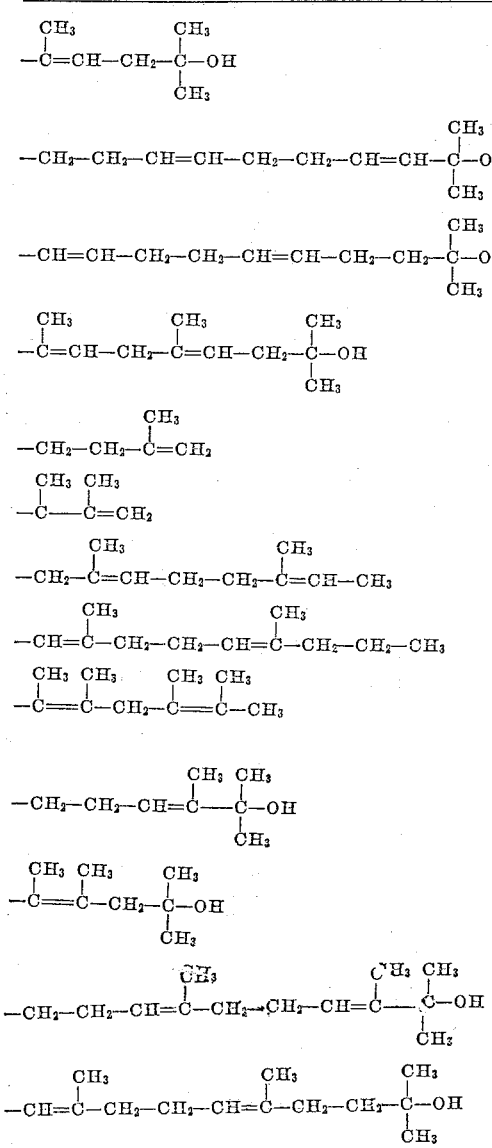
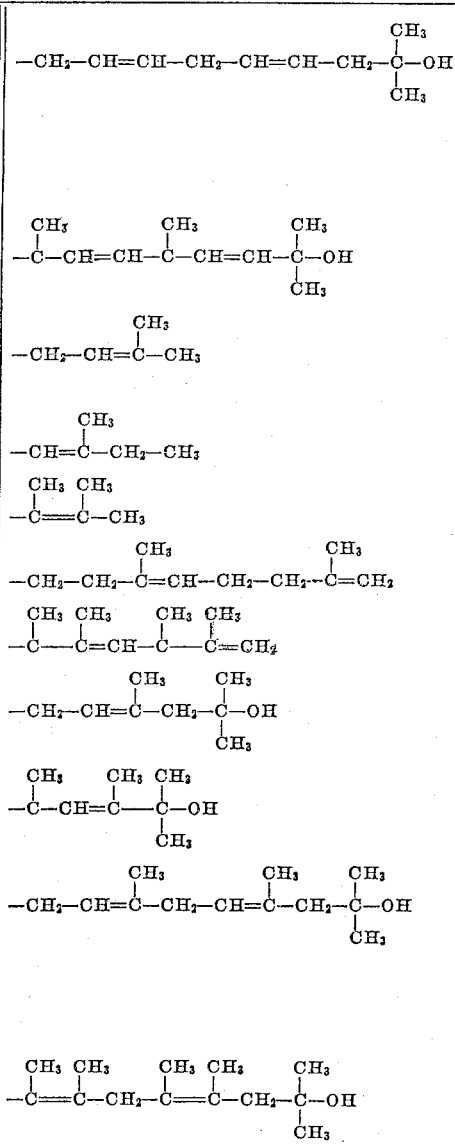

In addition to the novel alcohols per se, this invention further resides in the preparation of these alcohols.

Briefly, the alcohols of this invention can be prepared by a reductive condensation reaction in which a carbonyl compound reacts with an unsaturated hydrocarbon compound in an oxygenated organic solvent in the presence of an alkali or alkaline earth metal to form the metal salt. The resultant metal salt is then hydrolyzed to give the desired alcohol. The amount of each reactant, that is, carbonyl compound and unsaturated hydrocarbon compound, can vary from equimolar amounts of each to a positive whole number in excess over one mole for one or the other reactant. The preferred amounts range from one mole of carbonyl compound per one mole of unsaturated hydrocarbon compound to two moles of carbonyl compound per five moles of unsaturated hydrocarbon compound. The most preferred reactant amount is two moles of carbonyl compound per three moles of unsaturated hydrocarbon compound.

The temperature range of the reaction is from about −70° C. to about +50° C., with a preferred temperature range of from about −10 to about +50. The pressure range of the reaction is from about 300 mm. to about 2000 mm., with a most preferred pressure range from about 600 mm. to about 1000 mm. The amount of oxygenated organic solvent required is an effective reactive amount. The amount of oxygenated organic solvent can range from about 3-fold to about 10-fold, with a preferred range of from about 5-fold to about 7-fold. The amount of alkali or alkaline earth metal required is an effective reactive amount. The amount of alkali or alkaline earth metal can range from about 1-fold to about 2-fold, with a most preferred range of from about 1-fold. The hydrolysis takes place with water alone, or with water and an acid. The amount of water and/or acid can vary from about 2-fold to about 5-fold.

Representative carbonyl compounds suitable in the process of this invention are organic carbonyl compounds which contain the carbonyl

group connected only to hydrogen or carbon atoms. Preferably, these carbonyl compounds are the aliphatic carbonyl compounds such as the aliphatic ketones and aldehydes. Of this group, the saturated acyclic monoketones and monoaldehydes of from 1 to 30 carbon atoms, inclusive of the carbonyl carbon atom, are most suitable. Saturated lower alkyl monoketones are preferred, for example, acetone, methyl ethyl ketone, diethyl ketone, methyl n-propyl ketone, methyl isopropyl ketone, methyl n-butyl ketone, methyl isobutyl ketone, pinacolin, ethyl n-butyl ketone, di-n-propyl ketone, diisopropyl ketone, methyl n-nonyl ketone, palmitone, and the like. Of these saturated lower alkyl ketones containing a monocarbonyl group, monoketones of from 3 to 12 carbon atoms are preferred, with those of from 3 to 6 carbon atoms most preferred. The most preferred specific ketone is acetone, other methyl ketones also being especially useful.

Other ketones which are also suitable are the aliphatic diketones such as the saturated acyclic ketones, for example, 2,3-butanedione, 2,4-pentanedione and 3,4-pentanedione, and the like, or the saturated lower alkyl ketone alcohols such as, for example, diacetone alcohol.

Representative unsaturated hydrocarbons which are suitable for the present invention are the

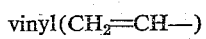

aromatic and aliphatic compounds containing a conjugated system of double bonds. Of these vinyl compounds the preferred compounds are the vinyl alkylene and vinyl benzene compounds. Representative vinyl alkylene compounds are 3-methyl-1, 3-pentadiene, 2,3-dimethyl-1,3-butadiene, 4-methyl-1,3-hexadiene, 2-methyl-2,4-hexadiene, 2,4-dimethyl-1,3-pentadiene, 2-isopropyl-1,3-butadiene, 1,1,3-trimethyl - 1,3 - butadiene, 2,4-octadiene, 2,2-dimethyl - 3,4 - hexadiene, 2,5,5-trimethyl-1,3-hexadiene, 1,1-dimethyl-3-t-butyl-1,3-butadiene, and the like. Of these vinylalkylenes, those preferred contain from 4 to 10 carbon atoms and may be straight or branch chained. Those most preferred contain conjugated olefinic bonds such as 1,3-butadiene, 1,3-pentadiene and 1,3,5-hexatriene. Representative vinylbenzene compounds are, for example, vinylbenzene, alpha-methyl vinylbenzene, alpha-ethyl vinylbenzene, alpha-isopropyl vinylbenzene, o-methyl vinylbenzene, 2,4,6-trimethyl vinylbenzene, p-butyl vinylbenzene, n-heptyl vinylbenzene, m-t-butyl vinylbenzene, and the like. It is preferred that the vinylbenzene compound contain from 8 to 16 carbon atoms. These vinylbenzene compounds can contain substituted or unsubstituted ring carbon atoms and vinyl groups. The substituents on the ring or vinyl group are preferably lower alkyl groups of from 1 to 4 carbon atoms. The most preferred vinylbenzene compounds are those containing an unsubstituted vinyl group and either a lower alkyl substituted or unsubstituted benzene ring. The most preferred single vinylbenzene compound is vinylbenzene.

Other unsaturated hydrocarbons such as the simple acyclic olefins, for example, lower alkene monoolefins as ethene, propene butene-1, butene-2, pentene-1, pentene-2, 2,3-dimethyl butene-2, hexene-1, 2-methyl pentene-1, 3,4-dimethyl hexene-2, and the like are reduced by sodium in acetone and oxygenated organic solvent, but not as easily as their conjugated diolefinic analogs, e.g., 1,3-butadiene.

Representative oxygenated organic solvents suitable for use in the invention include the ether solvents, and they can be either aliphatic or aromatic. They can be saturated aliphatic or unsaturated aliphatic; they can be monoethers, diethers, or triethers, and they can contain one or more hydroxyl groups in addition to the ether groups. Of these aliphatic ether solvents, those preferred are the saturated acyclic and alicyclic ethers containing only ether groups and from 2 to 10 carbon atoms. Representative saturated acyclic ethers include, for example, methyl ether, ethyl methyl ether, ethyl ether, ethyl n-propyl ether, n-propyl ether, i-propyl ether, n-butyl ether, i-butyl ether, t-butyl ether, n-hexyl ether, n-heptyl ether, methylal, acetal, and the like. Of course saturated acyclic ethers, those most preferred are the saturated acyclic monethers (lower alkyl monoethers) of from 2 to 6 carbon atoms. The most preferred specific ether is ethyl ether. Representative alicyclic ethers include the alkylene oxides, dialkylene dioxides and trialkylene trioxides wherein alkylene is in each case alkylene of from 2 to 10 carbon atoms, for example, ethylene oxide, 1,2-propylene oxide, 1,3-propylene oxide, 1,4-dioxane, methylal, acetal, trioxymethylene, tetrahydrofuran, tetrahydropyran, trioxane and the like. Of the saturated alicyclic ethers, those most preferred are the saturated alkylene oxides and the dialkylene dioxides of from 2 to 10 carbon atoms. The most preferred specific alkylene oxide is tetrahydrofuran and the most preferred dialkylene dioxide in dioxane. Representative ethers containing hydroxyl groups are the glycol ethers, for example, ethylene glycol monomethyl ether, ethylene glycol monoethyl ether, ethylene glycol mono-n-butyl ether, ethylene glycol monophenyl ether, ethylene glycol monobenzyl ether, and the like. Any combination of two or more of the above ethers is a suitable oxygenated organic solvent, for example, ethyl ether-dioxane, dioxane-tetrahydrofuran, and so forth. Also suitable as solvents are the commercially available Diglyme solvents such as, for example, ethylene glycol dimethyl ether and diethylene glycol dimethyl ether. This particular class of solvents may be referred to as the alkylene glycol dialkyl ethers wherein alkylene is mono- or dialkylene of 1–5 carbon atoms and each alkyl of the dialkyl contains 1–5 carbon atoms.

The alkali metals which are most suitable are lithium, sodium and potassium, particularly sodium. The alkaline earth metals most suitable are magnesium and calcium. Hydrolysis of the resultant alkali or alkaline earth metal salt can take place within, for example, aqueous acetic acid.

The novel alcohols of this invention can be referred to as 1:1 hydroxylic adducts, 1:2 hydroxylic adducts, 2:1 hydroxylic adducts, 2:2 hydroxylic adducts, and so forth. The first digit represents the number of aliphatic alcohol group(s) derived from the corresponding aliphatic carbonyl compound present in the resultant adduct. The second digit represents the number of aromatic-substituted aliphatic group(s) derived from the corresponding vinyl compound present in the resultant adduct. For example, of particular interest in this invention are the 1:1 hydroxylic adduct, 1:2 hydroxylic adduct, 2:1 hydroxylic adduct, 2:2 hydroxylic adduct, 2:3 hydroxylic adduct, 2:4 hydroxylic adduct, and 2:5 hydroxylic adduct of acetone with styrene, acetone with butadiene and acetone with isoprene.

The reaction of a typical vinyl compound, e.g., styrene, with a typical carbonyl compound, e.g., acetone, in a typical oxygenated organic solvent in the presence of sodium metal will more specifically illustrate the general character of the process of this invention. The distribution of the products obtained from the co-reduction of styrene and acetone are dependent on the particular solvent employed. For example, styrene and acetone react in an oxygenated organic solvent in the presence of sodium to yield phenylmethyl butanols, dimethylphenyl hexanediols, and dimethyldiphenyl octanediols, as hydroxylic adducts. The distribution of these adducts is dependent on the particular oxygenated organic solvent employed. In diethyl ether the most predominant products are the 1:1 acetone styrene hydroxylic adducts, i.e., 2-methyl-3-phenyl butanol-2 and 2-methyl-4-phenyl butanol-2, and the 2:1 acetone-styrene hydroxylic adduct, i.e., 2,5-dimethyl-3-phenyl hexanediol-2,5. In tetrahydrofuran solvent the most predominant product is the 2:2 acetone-styrene hydroxylic adduct, i.e., 2,7-dimethyl-3,6-diphenyl octanediol-2,7, although the 1:1 hydroxylic adduct, 2:1 hydroxylic adducts as well as the 2:3 hydroxylic adduct, i.e., 2,9-dimethyl-3,5,8-triphenyl decanediol-2,9 are obtained. The 2:2 acetone-styrene hydroxylic adduct diol was isolated in 2-diasteriometric forms which melt at 118–138° C. In dioxane-ether solutions (80% volume) a mixture of all five of the above hydroxylic adducts, in addition to the 1:2 acetone-styrene adduct, 2-methyl-3,6-diphenyl hexanol-2, are obtained.

In addition to the above alcohols or hydroxylic adducts the simple reduction products isopropyl alcohol and ethyl benzene are formed in small yields. The bimolecular reduction product from styrene, 1,4-diphenyl butane, is formed in varying yields, depending on the temperature of the reaction.

With styrene, acetone, sodium metal and an oxygenated organic solvent such as, for example, ether, dioxane and tetrahydrofuran, hydroxylic adducts containing from 1 to 5 styrene units with from 1 to 2 acetone units can be obtained. The particular product distribution depends upon reaction conditions such as temperature, solvent, and concentration of reactants.

For illustrative purposes, a mixture of styrene and acetone in an oxygenated organic solvent reacts with sodium metal via the styrene ketyl intermediate shown in Formula III:

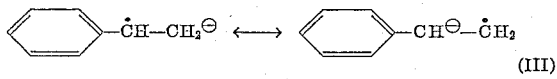

(III)

This ketyl can then react with acetone at either the alpha or beta carbon center to produce the two isomeric 1:1 adduct alcohols. Further, the ketyl can dimerize tail to tail to form the 1,4-dicarbanion of 1,4-diphenyl butane, which in turn reacts with 2 moles of acetone to produce the below 2:2 adduct diol, and so forth. So it may be seen that it is possible to produce hydroxylic adducts of styrene and acetone containing a chain of varying numbers of styrene units terminated by dimethyl carbinol groups.

The following schematic reaction of styrene with acetone in ether in the presence of sodium metal, and three representative hydroxylic adducts thereby obtained, specifically illustrates the nature of the process of this invention.

The above sodium-styrene-acetone-ether reaction can be carried out at room temperature or elevated temperatures of about 50–60° C. of the reaction is moderated by an atmosphere of carbon dioxide. In tetrahydrofuran, under these conditions, i.e., elevated temperatures and an atmosphere of carbon dioxide, the formation of the 2:2 hydroxylic adduct, 2,7-dimethyl-3,6-diphenyl-2,7-octanediol, is suppressed. In ether, the yields of the isomeric 1:1 hydroxylic adducts, 2-methyl-3-phenyl-2-butanol and 2-methyl-4-phenyl-2-butanol, appear unaffected by the carbon dioxide atmosphere. In addition there is formed about a 6% yield of 1,4-diphenyl butane. The isomeric 2,3- and 1,3-diphenyl butanes are not produced.

The effect of a carbon dioxide atmosphere on the reaction is a retarding one. In the presence of carbon dioxide, the reaction of sodium with acetone and styrene is very slow. However, at elevated temperatures, the reaction proceeds rapidly. Thus, with a carbon dioxide atmosphere, the reaction can be carried out in ether at 65° C. in a controlled manner. Under unusual conditions at these temperatures extensive polymerization of the olefin will occur. It is interesting to note that the yields of 1,4-diphenyl butane and ethyl benzene at 65° C. are significantly higher than 0° C. The low yields of carboxylic acids formed under a carbon dioxide atmosphere indicates that the concentration of carbon dioxide in solution at the elevated temperature is small (probably due to the high partial pressure of the solvent).

In addition to the solvent effects and temperature, the yields of products are also dependent on the concentration

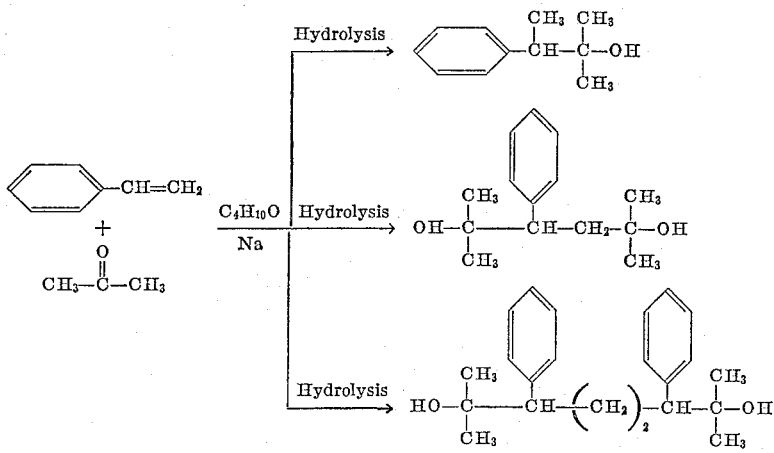

Similar reactions take place between butadiene and acetone, as well as between isoprene and acetone.

In tetrahydrofuran as solvent, butadiene and isoprene react with acetone and sodium to produce mixtures of isomeric $C_7$ and $C_8$ unsaturated alcohols. In addition to the 1:1 hydroxylic adducts, butadiene and isoprene produce the 2:1 adduct diols and other hydroxylic adducts analogous to those obtained with styrene.

Actone reacts in ether or tetrahydrofuran, with sodium metal and styrene, butadiene or isoprene to give as the principal product 1:1 hydroxylic adducts. For example, acetone and styrene react with sodium metal in ether at 0° C. to produce two isomeric alcohols—that is, two isomeric 1:1 hydroxylic adducts, 2-methyl-3-phenyl-2-butanol and 2-methyl-4-phenyl-2-butanol in about 26% and 28% yields, respectively. In addition a 2:1 hydroxylic adduct, 2,5-dimethyl-3-phenyl-2,5-hexanediol, is formed in about 9% yield. Small amounts of ethyl benzene, isopropyl alcohol and mesityl oxide are also formed. A similar reaction in tetrahydrofuran leads principally to a 2:2 hydroxylic adduct, 2,7-dimethyl-3,6-diphenyl-2,7-octanediol, in about 80% yield, in addition to about a 15% yield of the above 1:1 hydroxylic adducts. It is of particular import to note from the above reactions that the known sodium-catalyzed carbanionic polymerization of styrene, which usually proceeds rapidly, is completely inhibited by the presence of acetone.

of the vinyl component. In fairly concentrated solutions, telomers higher than the 2:2 adduct are formed. Polystyrene containing the dimethyl carbonyl groups, in addition to an amorphous mixture of lower molecular weight (500) are formed. Material analyzing for three and four styrene units with two acetone moieties are observed.

The reaction of diacetone alcohol and styrene with sodium yields products which are the same as those obtained with acetone. Also, similar reactions take place between butadiene or isoprene with esters, e.g., the lower alkyl esters such as methyl propionate, and with adehydes, e.g., the lower alkyl adehydes such as acetaldehyde, in oxygenated organic solvents in the presence of sodium metal.

The novel hydroxylic adducts of this invention are useful as chemical intermediates. They are of particular utility as chemical intermediates for the preparation of valuable polymeric and resinous products having further utility in the polymer and resin fields. They are also useful as modifiers in alkyd resins and as intermediates for the dihydroxylic adducts. The dihydroxylic adducts are useful as alkyd resins employed in surface coating applications.

It is to be understood, however, that the invention is not to be limited to the exact details of operation or exact adducts shown and described herein, as obvious modifications and equivalents will be apparent to one skilled in the art and the invention is, therefore, limited only by the scope of the appended claims.

The following representative examples illustrate the process and adducts within the purview of this invention and act as specific teachings to those skilled in the art to which this invention pertains.

EXAMPLE I.—THE REACTION OF STYRENE AND ACETONE WITH SODIUM IN ETHER

Sodium (30 g.) was pressed in wire form into 600 ml. of absolute ether. The mixture was continuously flashed with dry nitrogen. It was cooled to —40° and 10 ml. of anhydrous acetone added. This was followed by the simultaneous addition of 150 ml. styrene and 95 ml. acetone at such a rate to maintain the temperature at approximately —10° ($\approx$1 hour). As the reaction proceeds the surface of the sodium remains shiny and appears molten. The reaction was stirred for an additional hour until the sodium was completely consumed; the mixture was homogeneous and appeared faintly grey. Acetic acid (100 ml.) and water were added simultaneously and the temperature maintained at 0°. The mixture was poured into an ice water slurry and extracted twice with ether. The colorless ethereal extract was washed with $NaHCO_3$ twice and dried to yield a colorless ethereal solution. Vacuum distillation yielded unreacted styrene contaminated with mesityl oxide and ethyl benzene. In addition, there was obtained 58.1 g. of a mixture of the isomeric 3-phenyl- and 4-phenyl-2-methyl-butanol-2's (B.P. 62–71°/3 mm.). Rectification of this mixture resolved it into its component alcohols consisting of 53.5% 3-phenyl-2-methyl butanol-2 (B.P. 62°/2 mm.) and 46.5% 4-phenyl-2-methyl butanol-2 (B.P. 86°/2 mm.). The material (17.7 g.) boiling at 110–121° at 3 mm. was predominantly 2,5-dimethyl-3-phenyl-hexanediol-2,5. The high boiling residue (3.6 g.) is predominantly 2-methyl-3,6-diphenyl hexanol-2.

EXAMPLE II.—THE REACTION OF STYRENE AND ACETONE WITH SODIUM IN ETHER

To a mixture of 30 g. sodium wire and 350 ml. absolute ether at —75° was added a little acetone and 200 ml. styrene in approximately 5 minutes. Acetone was then added dropwise to maintain the temperature at —15° to —10° (1 hour). The reaction was stirred for an additional hour at —10° until most of the sodium was consumed. The homogeneous solution was then cooled to —20° and 130 ml. acetic acid and occasional portions of water were added to maintain the temperature at 0° C. The reaction was then poured into an ice water slurry and extracted twice with ether. The combined ethereal extracts were washed with water, $K_2CO_3$ solution and water again, and dried over $Na_2SO_4$. The volatile components consisting of ether and styrene were then removed by vacuum distillation to yield 109 g. of styrene and 11 g. ethyl benzene. There was also obtained 51.5 g. of a mixture of the isomeric 3-phenyl- and 4-phenyl-2-methyl-butanol-2's (B.P. 76–86°/25 mm.), 17.8 g. of a mixture of isomeric phenyldimethylhexanediols, and 3.1 g. of high boiling residues.

This reaction was repeated at 0° and yielded 119 g. recovered styrene, 10 g. ethyl benzene, 52.4 g. of isomeric phenyl methyl butanols (B.P. 77–90/4 mm.), 21.4 g. of isomeric phenyldimethylhexanediols (B.P. 125–134°/3 mm.), 2.0 g. 1,4-diphenylbutane, and 6.7 g. of high boiling residues.

EXAMPLE III.—THE REACTION OF STYRENE AND ACETONE WITH SODIUM AND CARBON DIOXIDE IN ETHER

A mixture of 30 g. sodium wire in 500 ml. ether was chilled to —78° and 10 ml. acetone and 150 ml. styrene were added. The system was then pressured with two atmospheres of carbon dioxide and acetone was added dropwise at a rate such that the temperature was maintained at 0° C. The surface of the sodium remained dull. After 60 ml. acetone had been added, the temperature was allowed to rise to 32° (1 hour). The surface of the sodium appeared dull and a small amount of flocculent solid was found suspended in the ether. The $CO_2$ pressure was replaced with argon and after a short induction period (approximately 5 minutes) the temperature rose rapidly (40°, one-half hour). The $CO_2$ pressure was reinstituted but the temperature continued to rise /65°). At this temperature the partial pressure of $CO_2$ in solution was low. With an 0.5 atmosphere $CO_2$ applied pressure, the addition of acetone was continued and the temperature remained at 60–65°. The reaction mixture became orange and solidified. To the mixture water was added slowly and the whole poured into ice water. The ether extracts were washed twice with saturated $NaHCO_3$ and then water. The $NaHCO_3$ extracts were decolorized with Norite and filtered to yield a clear cream-colored solution. It was acidified with dilute sulfuric acid at 0° and re-extracted twice with ether. The ether solutions after drying yielded 3.5 g. of a viscous carboxylic acid(s) which were not identified further.

Distillation of the original ethereal solution yielded 60.9 g. of a mixture of the isomeric 3-phenyl- and 4-phenyl-2-methyl-butanol-2's. 12.1 g. of 1,4-diphenylbutane, 18.5 g. of isomeric phenyldimethylhexanediols, 5.5 g. of an unidentified crystalline ketone, 6.3 g. of isomeric dimethyldiphenyloctanediols of non-distillable residues.

Since the dimethylphenylhexanediol, 1,4-diphenylbutane and the ketone co-distill, it is necessary to separate them by crystallization from isopentane in which the ketone and diphenylbutane are insoluble in the cold. The ketone is separated from the hydrocarbon by recrystallization from isopentane. The dimethylphenylhexanediol is most conveniently obtained as the hemihydrate by chilling an isopentane solution in a dry ice bath and allowing atmospheric moisture to condense. It can be purified by sublimation as a super-cooled liquid or by distilling off the water of hydration.

If the reaction is repeated continuously maintaining the applied total pressure of $CO_2$ at 2 atmospheres the reaction is sluggish. It is moderately exothermic, however, and after half an hour the temperature rises to 37° (90 ml. acetone added). After an hour the reaction temperature reached 40° and the reaction became more vigorous and maintained itself despite applied $CO_2$ pressure at 56°. At the end of 2½ hours, the reaction was complete. Under these conditions it appears that the applied $CO_2$ pressure moderated the reaction and enabled it to be carried out at higher temperatures. Under these conditions 45.0 g. of a mixture of the isomeric 3-phenyl- and 4-phenyl-2-methyl-butanol-2's, 19.5 g. of isomeric phenyldimethylhexanediols, and 5.7 g. of nondistillable residues were obtained.

EXAMPLE IV.—THE REACTION OF STYRENE AND ACETONE WITH SODIUM IN TETRAHYDROFURAN

To 30 g. of sodium wire in 350 ml. THF at —60° was added 10 ml. of acetone. Acetone (150 ml.) and 230 ml. styrene were then added dropwise simultaneously to maintain the temperature at —25° (1 hour). The reaction was then stirred for 2 hours at 0°. Acetic acid (100 ml.) and water were added at 0° and the reaction mixture poured into ice water slurry. When the mixture was extracted with ether a colorless solid (6 g.) separated. It was identified as polystyrene (with hydroxyl end groups).

Analysis of polystyhene $(C_8H_8)_n$:

|   | Found | Calculated |
|---|---|---|
| C | 92.1 | 92.3 |
| H | 7.8 | 7.74 |

The viscous ethereal solution was heated with 1.5 liters of methanol whereupon more colorless solid (11 g.) precipitated. The analysis is consistent with a compound consisting of 3 styrene units for each 2 acetone units. The compound has been designated as 2,9-dimethyl-3,5,8-triphenyldecanediol-2,9.

Analysis for $(C_6H_8)_3$, $(C_3H_7O)_2$, $C_{30}H_{38}O_2$:

|  | Found | Calculated |
|---|---|---|
| C | 82.8 | 83.7 |
| H | 9.1 | 8.9 |
| Molecular weight | 412±16 | 431 |

Vacuum distillation of the ether-methanol solution yielded a very viscous oil and a crystalline solid. When it was treated with Skelly C it deposited more heavy crystalline precipitate. The crystalline precipitate (66.6 g.) is a mixture of the diastereomeric dimethyldiphenyloctanediols with the higher melting isomer predominating (≈90%). The viscous oil was fractionated into 14.1 g. of methylphenyl butanols, 5 g. of isophorone (2,4-phenyl hydrazine, M.P. 129°), 3 g. dimethylphenylhexanediol. Analysis for residues (B.P. >140° at 2 mm.).

Analysis for residues $(C_8H_8)_4$, $(C_3H_7O)_2$, $C_{38}H_{46}O_2$:

|  | Found | Calculated |
|---|---|---|
| C | 86.2, 85.9 | 85.4 |
| H | 8.6, 8.6 | 8.5 |
| Molecular weight | 551±12 | 535 |
| Hydroxyl value | .348, .398 | .372 |

EXAMPLE V.—THE REACTION OF STYRENE AND ACETONE WITH SODIUM IN TETRAHYDROFURAN

A mixture of 30 g. sodium wire and 350 ml. THF was chilled to −75°. Initially 5 ml. of acetone was added and then 150 ml. of acetone and 130 ml. styrene were added simultaneously at −40° to −35° (10 minutes). The reaction was stirred at 0° and after 20 minutes the reaction was viscous and opaque. An additional 120 ml. of acetone was added at 0° (1 hour) and the reaction stirred for an additional hour. Acetic acid (130 ml.) and water were added to the mixture and the whole poured into an ice water slurry. The reaction was extracted with ether; the ethereal extract washed with saturated $NaHCO_3$ and water. No polystyrene was formed. Vacuum distillation of the ether and styrene yielded a heterogeneous mixture of a viscous liquid and a crystalline solid. The ethereal distillate is a mixture containing styrene (10.1 g.), ethyl benzene (4.8) and mesityl oxide (3.9 g.). Skelly B was added to the semisolid mixture to separate the crystalline insoluble material which is isomeric dimethyldiphenyloctanediol (78 g.). The Skelly B solution on vacuum distillation yielded 17.9 g. of a mixture of isomeric methylphenyl butanols, 3.2 g. of isophorone and 60.5 g. of a light-yellow amorphous solid (B.P.: >140°/3 mm.). The non-distillable amorphous residues showed an hydroxyl absorption at 2.8μ and characteristic aromatic bands in the infrared spectrum. Its analysis is compatible with a structure consisting of 3 styrene and 2 acetone units.

Analysis for $(C_8H_8)_3$, $(C_3H_7O)_2$, $C_{30}H_{38}O_2$:

|  | Found | Calculated |
|---|---|---|
| C | 83.8 | 83.7 |
| H | 9.0 | 8.9 |
| Hydroxyl value (eq./100 g.) | .404 | .464 |
| Molecular weight: | | |
| Ebull. Ethanol | 315±20 | 431 |
| Ebull. Methylene chloride | 350±17 | |

EXAMPLE VI.—THE REACTION OF STYRENE AND ACETONE WITH SODIUM AND CARBON DIOXIDE IN TETRAHYDROFURAN

To 30 g. of sodium wire in 500 ml. THF at −45° was added 15 ml. of acetone and then 150 ml. styrene. The nitrogen was replaced with carbon dioxide and the total applied pressure maintained at 2 atmospheres. Acetone (120 ml.) was added over 1 hour at 0° but the reaction did not appear to be going. The temperature was allowed to rise to 35° by removing the cold bath (½ hour) and the reaction allowed to proceed at 35–40° for an additional hour. The grey but homogeneous mixture was quenched by pouring it into an ice dilute $H_2SO_4$ solution. Approximately 10 g. of unreacted sodium remained in the kettle. The light-brown mixture was extracted with ether and the ether solutions washed with saturated $NaHCO_3$ three times. The dark-brown bicarbonate extracts were treated with Norite and carefully reacidified to yield 3 g. carboxylic acid(s). Its infrared spectrum was similar to that obtained in ether. The original ether extract yielded styrene (103 g.), methylphenyl butanol (14.1 g.), 1,4-diphenylbutane (3 g.), dimethyldiphenylhexanediol (5.1 g.), and 17 g. of nondistillable residues (B.P. >160°/1 mm.).

Analysis for residues $(C_8H_8)_4$, $(C_3H_7O)_2$, $C_{38}H_{46}O_2$:

|  | Found | Calculated |
|---|---|---|
| C | 86.5 | 85.4 |
| H | 8.5 | 8.5 |
| Molecular weight |  | 535 |
| Hydroxyl value (eq./100 g.) | 0.355, 0.356 | 0.372 |

EXAMPLE VII.—THE REACTION OF STYRENE AND ACETONE WITH SODIUM IN DIOXANE

To 30 g. of sodium wire in 400 ml. dioxane and 100 ml. ether at 3° was added dropwise simultaneously 150 ml. styrene and 100 ml. acetone at a rate (½ hour) to maintain the temperature at 3° with external cooling. This was followed by an additional 100 ml. of acetone (1 hour). Most of the sodium was consumed. The clear colorless fairly viscous solution was titrated with 150 ml. acetic acid and water, and then poured onto 500 ml. of ice water slurry and extracted with ether. After drying with $Na_2SO_4$ the ethereal solution was vacuum distilled to remove styrene (2 g.) and ethyl benzene (3 g.). The residue was a viscous oil (197 g.). Isopentane (100 ml.) was added and the solution on setting overnight deposited crystals of dimethyldiphenyloctanediol (M.P. 135–138°) 30.5 g. More isopentane (50 ml.) was added and the solution cooled to 0° whereupon 6.5 g. of the diastereomeric dimethyldiphenyloctanediol (M.P. 113–117) was obtained. The higher melting isomer was purified by crystallization from methylcyclohexane, vacuum sublimation and recrystallization (M.P. 135.0–135.7°). The melting isomer was purified by crystallization from absolute ethanol from which it crystallizes as transparent platelets containing ethanol of solvation which is removed by vacuum drying (M.P. 118–119°).

The remaining isopentane mother liquor was vacuum distilled to yield 17.5 g. of isomeric methylphenyl butanols (B.P. 71–94°/3 mm.; $n_D^{25}$: 1.4878 (1.5202), 22.1 g. of dimethylphenylhexanediol (B.P. 130–147/3 mm.; $n_D^{25}$: 1.5382–1.5453), 46.4 g. of diphenylhexanol (B.P. 168–176/3 mm.; $n_D^{25}$: 1.5483–1.5495), 19.6 g. of additional dimethyldiphenyloctanediol (B.P. 176–192°/1 mm.; $n_D^{25}$: 1.5498–1.5490), 7 g. of 1,4-diphenylbutane and 25.8 g. of nondistillable residues (B.P. >200°/2 mm.). The latter analyzes approximately for a compound consisting of 3 styrene and 2 acetone units.

Analysis for residue $(C_8H_8)_3$, $(C_3H_7O)_2$, $C_{30}H_{36}O_2$:

|  | Found | Calculated |
|---|---|---|
| C | 83.8 | 83.7 |
| H | 9.2 | 8.9 |
| Molecular weight | 392±14 | 431 |
| Hydroxyl value | .497 | .464 |

EXAMPLE VIII.—THE REACTION OF STYRENE AND DIACETONE ALCOHOL WITH SODIUM IN ETHER

To a mixture of 30 g. sodium wire in 450 ml. ether at —54° was added 10 ml. of diacetone alcohol and then 150 ml. of styrene. Diacetone alcohol (100 ml.) was then added dropwise at such a rate as to maintain the temperature at 0–5° (2 hours). The clear homogeneous solution was chilled to —5° and 100 ml. acetic acid and 100 ml. water added. The mixture was then poured into an ice-water slurry and extracted with ether. The ethereal solutions yielded 66.4 g. methyl phenyl butanols (B.P. 68–87/2.5 mm.; $n_D^{25}$: 1.4951–1.5090), 23.6 g. of dimethylphenylhexanediol (B.P. 124–137°/2.5 mm.), $n_D^{25}$: 1.5291–1.5211; 14.5 g. diphenylhexanol (B.P. 163–184°/2.5 mm.; $n_D^{25}$: 1.5427–1.5437) and only 4.1 g. of nondistillable residue (B.P. >185°/2.5 mm.).

EXAMPLE IX.—REACTION OF ISOPRENE AND ACETONE WITH SODIUM IN TETRAHYDROFURAN

To a mixture of sodium wire (33 g.) in 400 ml. of THF at —40° was added 125 ml. isoprene. Acetone (150 ml.) was then added dropwise at such a rate to maintain the temperature at 3–5° (30 minutes). The light yellow homogeneous reaction was allowed to stir at 25° for 30 minutes to react all of the sodium. Sulfuric acid (30%) was added dropwise to the mixture with cooling. The mixture was then added to an ice water slurry and extracted three times with ether. The ethereal solution was washed with saturated $NaHCO_3$ and water and dried with $Na_2SO_4$. The ethereal solution on distillation yielded 67 g. of a mixture of dimethylhexanols (B.P. 143–151°, $n_D^{25}$: 1.4428–1.4361), 12 g. of a mixture of dimethyloctanediols (B.P. 84–95°/2 mm., $n_D^{25}$: 1.4746–1.4754), 4 g. of trimethyldecadienols (B.P. 95–125°/2 mm., $n_D^{25}$: 1.5018–1.5035, B.P. >190°/2 mm.). In addition, mesityl oxide (10.5 g.) and isophorone (6.7 g.) are formed from the base catalyzed condensation of acetone.

If the reaction was carried out at 20–25° the amount of 1:1 adduct (55.9 g.) remains approximately constant. There was formed, however, 33.4 g. of a mixture of 2:1 and 1:2 adducts and 22.2 g. polyisoprene residues.

*Isoprene-acetone adducts*

1:1 HYDROXYLIC ADDUCTS

The 1:1 adducts of isoprene and acetone consist of a mixture containing at most four possible structural isomers: 2,4-dimethylhexen-4-ol-2, 2,4-dimethylhexen-5-ol-2, 2,5-dimethylhexen-4-ol-2 and 2,5-dimethylhexen-5-ol-2. The mixture of 1:1 adduct alcohols (B.P. 143–151°) was carefully redistilled through a 3-foot heliquid spinning band column at 40 mm. It yielded two major portions boiling at 70–73° ($n_D^{25}$: 1.4438) and 78–81 ($n_D^{25}$: 1.4442) of approximately equal amounts. The known boiling portion has infrared absorption bands at 10.6 and 11.25µ (5) and the higher boiling constituent at 10.2 (m), 10.5 (m) and 11.05 (s). The nuclear magnetic resonance spectrum of each indicated that neither was pure.

Analysis for dimethylhexanol (B.P. 70–73°) $(C_8H_{16}O)$:

|  | Found | Calculated |
|---|---|---|
| C | 74.7 | 75.0 |
| H | 12.5 | 12.6 |

2:1 HYDROXYLIC ADDUCTS

The mixture of adducts consisting of two acetone and one isoprene unit boils at 84–95°/2 mm. and was not resolved into its components. Its structure is presumably that of the 1,4 adduct, 2,4,7-trimethylocten-4-diol-2,7.

Analysis for trimethyloctenediol $(C_{11}H_{22}O_2)$:

|  | Found | Calculated |
|---|---|---|
| C | 71.9 | 70.9 |
| H | 11.7 | 11.9 |

1:2 HYDROXYLIC ADDUCT

The mixture of adducts consisting of one acetone and two isoprene units boils at 95–125°/2 mm. and is a mixture of several isomers. A possible structure is related to 2,4,8-trimethyldecadien-4,8-ol-2.

Analysis for nondistillable residues (polyisoprene) $(C_8H_8)_n$. The infrared spectra of these residues showed the presence in varying degrees of intensity hydroxyl absorptions (2.95µ):

|  | Found | Calculated |
|---|---|---|
| C | 87.0, 86.5 | 88.2 |
| H | 11.8, 11.9 | 11.8 |

EXAMPLE X.—THE REACTION OF BUTADIENE AND ACETONE WITH SODIUM IN TETRAHYDROFURAN

Sodium wire (30 g.) and 350 ml. THF were cooled to —80° and 5 ml. acetone and 300 ml. butadiene were added. Acetone (135 ml.) was added dropwise at 15° over one hour. The reaction was stirred for an additional 10 minutes at 0° and then poured onto a mixture of ice and water containing 80 g. $H_2SO_4$. It was extracted with ether and the ethereal solution washed with saturated $NaHCO_3$ and water. It yielded 45.5 g. of 1:1 adducts (B.P. 122–131°; $n_D^{25}$: 1.4313–1.4347), 18 g. of 2:1 adducts, 3.1 g. of 1:2 adducts and 1.4 g. of nondistillable residue (B.P. >120°/2 mm.; $n_D^{25}$: 1.5014).

*Butadiene-acetone adducts*

1:1 HYDROXYLIC ADDUCTS

The mixture of adducts containing one acetone and one butadiene unit (B. P. 122–131°) was carefully refractionated at 90 mm. with a 3-foot spinning band column. It yielded two portions boiling at 78–80° ($n_D^{25}$: 1.4368) and 85–87° ($n_D^{25}$: 1.4352). The lower boiling isomer had infrared absorption bands at 10.03, 10.6 and 11.0µ while the higher boiling component absorbed at 10.38 and 11.03µ. The nuclear magnetic resonance spectrum of the lower boiling fraction indicated the presence of a characteristic vinyl end group (absorption at 187, 204 and 253 c.p.s. relative to TMS internal reference); the higher boiling isomer is a mixture (204 and 219 c.p.s.) probably possessing an internal double bond.

Analysis for 2-methylhexenol-2 (B.P. 78–80°) $C_7H_{14}O$:

|   | Found | Calculated |
|---|---|---|
| C | 73.6 | 73.6 |
| H | 12.2 | 12.37 |

Analysis for 2-methylhexenol-2 (B.P. 85–87°) $C_7H_{14}O$:

|   | Found | Calculated |
|---|---|---|
| C | 73.3, 73.2 | 73.6 |
| H | 12.3, 12.3 | 12.37 |

2:1 HYDROXYLIC ADDUCT

The 2:1 adduct consisting of two acetone and one butadiene unit distills at 82–84°/1 mm. ($n_D^{25}$: 1.4634) and melts at 68–69°. Its infrared absorption spectrum shows prominent bands at 10.25 and 11.10. It is probably the 1,4-adduct, 2,7-dimethylocten-4-diol-2,7.

Analysis for dimethyloctenediol $C_{10}H_{20}O_2$:

|   | Found | Calculated |
|---|---|---|
| C | 69.9, 69.8 | 69.8 |
| H | 11.7, 11.7 | 11.69 |

EXAMPLE XIII.—2,5-DIMETHYL-3-PHENYL-HEXANEDIOL-2,5

The subject diol is obtained from the reaction of styrene and acetone with sodium in ether (vide infra) and represents the condensation of two acetone units with one of styrene. After repeated rectification it was obtained pure (B.P. 130–132/2 mm.; $n_D^{20}$: 1.5272). On prolonged standing it crystallizes into linear crystals, M.P. 73–74°. The crystalline diol, however, after melting supercools badly and is difficult to crystallize. A solution of the diol in isopentane on chilling in a Dry Ice bath absorbs enough moisture to deposit fine needles of hemihydrate, M.P. 62–63°.

Analysis for 2,5-dimethyl-3-phenylhexanediol-2,5 ($C_{14}H_{22}O_2$):

|   | Found | Calculated |
|---|---|---|
| C | 75.4, 75.7 | 75.6 |
| H | 10.0, 10.1 | 9.97 |
| Hydroxyl value (eq./100 g.) | 0.894 | .900 |
| Molecular weight | 228±7 | 222 |

Analysis for 2,5-dimethyl-3-phenylhexanediol-2,5 hemihydrate ($C_{14}H_{22}O_2$).

|   | Found | Calculated |
|---|---|---|
| C | 72.9, 72.7 | 72.8 |
| H | 10.1, 10.0 | 10.0 |
| Molecular weight (ethanol azeotrope) | 242±7 | 231.3 |
| Hydroxyl value (LiAlH$_4$) | 0.85 | 0.862 |
| Water (percent weight) (Fischer) | 3.8 | 3.9 |

EXAMPLE XIV.—2-METHYL-3,6-DIPHENYL-HEXANOL-2

The subject alcohol was a product obtained from the reaction of styrene and acetone with sodium in dioxane (vide supra) and represents the incorporation of two styrene moieties with said acetone. Distillation yielded material boiling at 168–175° at 2.5 mm. which is a viscous liquid ($n_D^{25}$: 1.5483) but could not be crystallized. A urethane was prepared from a mixture of 2 g. of the alcohol, 1 g. of phenyl isocyanate and 1 drop pyridine heated in a sealed tube on a steam bath for 60 hours. It was recrystallized from n-hexane to yield phenyl urethane melting at 122.5–123.0°.

Analysis for 2-methyl-3,6-diphenylhexanol-2 ($C_{19}H_{24}O$):

|   | Found | Calculated |
|---|---|---|
| C | 84.5, 84.7 | 85.0 |
| H | 9.2, 9.1 | 9.03 |
| Molecular weight | 284±5 | 268.4 |
| Hydroxyl value (eq./100 g.) | 0.368, 0.405 | .373 |

Analysis for urethane of methyldiphenylhexanol ($C_{25}H_{27}O_2N$):

|   | Found | Calculated |
|---|---|---|
| C | 80.60, 80.68 | 80.3 |
| H | 7.55, 7.62 | 7.28 |
| N (Kjeldahl) | 3.61, 3.69 | 3.75 |

EXAMPLE XV.—2,7-DIMETHYL-3,6-DIPHENYL-OCTANEDIOL-2,7

The diol, 2,7-dimethyl-3,6-diphenyloctanediol-2,7 exists as two deastereoisomers, dl and meso. Both compounds are isolated from the reaction of styrene and acetone with sodium in dioxidane or tetrahydrofuran and represent the condensation of two styrene and two acetone units. They are crystalline compounds recrystallizable from methyl cyclohexane and are roughly separable by cooling their concentrated solution in isopentane, whereupon the higher melting isomer crystallizes quickly. Filtration and further standing allow the lower melting isomer to separate. They are further purified by recrystallization from absolute ethanol in which the higher melting isomer is quite soluble and the lower melting isomer crystallizes in beautiful hexagonal crystals containing loose molecules of solvation. The ethanol of solvation deliquesces in air to leave a colorless white solid (M.P. 118–119°, B.P. 192–196/1 mm.). The higher melting isomer was recrystallized from methyl cyclohexane to yield colorless crystals melting at 135.3–136.0°. The diurethane of the 118° isomer melts with decomposition at 188.5°.

Analysis for 2,7-dimethyl-3,6-diphenyloctanediol-2,7 (118° isomer) ($C_{22}H_{30}O_2$):

|   | Found | Calculated |
|---|---|---|
| C | 81.44, 81.38 | 81.0 |
| H | 9.32, 9.33 | 9.27 |
| Hydroxyl value (eq./100 g.; LiAlH$_4$) | .605 | .613 |

Analysis for bis-phenylurethane of dimethyldiphenyloctanediol-2,7 (118° isomer) ($C_{36}H_{40}O_4N_2$):

|   | Found | Calculated |
|---|---|---|
| C | 76.7, 76.9 | 76.6 |
| H | 7.3, 7.4 | 7.15 |
| N | 4.97 | 4.96 |

Analysis for 2,7-dimethyl-3,6-diphenyloctanediol-2,7 (136° isomer) ($C_{22}H_{30}O_2$):

|   | Found | Calculated |
|---|---|---|
| C | 81.0 | 81.0 |
| H | 9.3 | 9.27 |

I claim as my invention:
1. A process for preparing a monohydroxylic adduct of a vinyl compound and a carbonyl compound by reacting (1) a vinyl compound selected from the group consisting of vinyl alkylenes having from 4 to 10 carbon atoms and vinyl benzenes having from 8 to 16 carbon atoms with (2) a carbonyl compound selected from the group consisting of acyclic alkyl monoketones having from 1 to 30 carbon atoms and acyclic alkyl monoaldehydes having from 1 to 30 carbon atoms, the molar ratio of the carbonyl compound to the vinyl compound being from 1:1 to 2:5, in a saturated aliphatic ether solvent having from 2 to 10 carbon atoms, said ether being selected from the group consisting of acyclic saturated aliphatic ethers and alicyclic saturated aliphatic ethers, in the presence of a metal selected from the group consisting of alkali metals and alkaline earth metals at a temperature from about −70° C. to about +50° C. and at a pressure from about 300 mm. to about 2000 mm., and hydrolyzing the metal salt thus obtained to the corresponding alcohol.

2. The process of claim 1 wherein the ether solvent is diethyl ether.

3. The process of claim 1 wherein the ether solvent is tetrahydrofuran.

4. The process of claim 1 wherein the ether solvent is dioxane.

5. A process for preparing an alkali metal mono-alcoholate by reacting a vinyl alkylene having from 4 to 10 carbon atoms with an acyclic alkyl monoketone having from 1 to 30 carbon atoms, the molar ratio of monoketone to vinyl alkylene being from 1:1 to 2:5, in the presence of an alkali metal at a temperature of from about −70° C. to about +50° C. and a pressure from about 300 mm. to about 2000 mm., in a saturated aliphatic ether solvent having from 2 to 10 carbon atoms, said ether being selected from the group consisting of acyclic saturated aliphatic ethers and alicyclic saturated aliphatic ethers.

6. A process for preparing an alkali metal mono-alcoholate by reacting a vinyl benzene having from 8 to 16 carbon atoms with an acyclic alkyl monoketone having from 1 to 30 carbon atoms, the molar ratio of said monoketone to said vinyl benzene being from 1:1 to 2:5, in the presence of an alkali metal at a temperature of from about −70° C. to about +50° C. and a pressure from about 300 mm. to about 2000 mm., in a saturated aliphatic ether solvent having from 2 to 10 carbon atoms, said ether being selected from the group consisting of acyclic saturated aliphatic ethers and alicyclic saturated aliphatic ethers.

7. A process for preparing a mono-hydroxylic adduct of styrene and acetone which comprises reacting said styrene with said acetone, the molar ratio of acetone to styrene being from 1:1 to 2:5, in saturated aliphatic ether solvent having from 2 to 10 carbon atoms, said ether being selected from the group consisting of acyclic saturated aliphatic ether and alicyclic saturated aliphatic ether, in the presence of sodium metal at a temperature of from about −70° C. to about +50° C. and a pressure from about 300 mm. to about 2000 mm., and hydrolyzing the resultant sodium salt to the corresponding mono-hydroxylic alcohol.

8. A process for preparing a mono-hydroxylic adduct of butadiene and acetone which process comprises reacting said butadiene with said acetone, the molar ratio of acetone to butadiene being from 1:1 to 2:5, in saturated aliphatic ether solvent having from 2 to 10 carbon atoms, said ether being selected from the group consisting of acyclic saturated aliphatic ether and alicyclic saturated aliphatic ether, in the presence of sodium metal at a temperature from about −70° C. to about +50° C. and a pressure from about 300 mm. to about 2000 mm., and hydrolyzing the resultant sodium salt to the corresponding mono-hydroxylic alcohol.

9. A process for preparing a mono-hydroxylic adduct of isoprene and acetone which process comprises reacting said isoprene with said acetone, the molar ratio of acetone to isoprene being from 1:1 to 2:5, in a saturated aliphatic ether solvent having from 2 to 10 carbon atoms, said ether being selected from the group consisting of acyclic saturated aliphatic ether and alicyclic saturated aliphatic ether, in the presence of sodium metal at a temperature from about −70° C. to about +50° C. and a pressure from about 300 mm. to about 2000 mm., and hydrolyzing the resultant sodium salt to the corresponding mono-hydroxylic alcohol.

10. Preparation of a sodium metal mono-alcoholate which comprises reacting styrene with acetone, the molar ratio of acetone to styrene being from 1:1 to 2:5, in saturated aliphatic ether solvent having from 2 to 10 carbon atoms, said ether being selected from the group consisting of acyclic saturated aliphatic ether and alicyclic saturated aliphatic ether, in the presence of sodium metal at a temperature from about −70° C. to about +50° C. and a pressure from about 300 mm. to about 2000 mm.

References Cited by the Examiner

UNITED STATES PATENTS

| | | | |
|---|---|---|---|
| 2,773,092 | 12/56 | Carley et al. | 260—635 X |
| 2,850,539 | 9/58 | Schott et al. | 260—635 |

OTHER REFERENCES

May et al.: Chem. Abstracts, vol. 49 (1953), page 256c.
Ansel: Chem. Abstracts, vol. 51 (1957), page 349e.
Petrov et al.: Chem. Abstracts, vol. 53 (1959), page 3145b.

LEON ZITVER, *Primary Examiner.*

CHARLES B. PARKER, *Examiner.*